United States Patent [19]

Torgrimsen

[11] Patent Number: 5,590,722
[45] Date of Patent: Jan. 7, 1997

[54] COMBINATION OF A REVERSIBLE PLOUGH AND SEED PREPARATION DEVICE

[75] Inventor: Tor Torgrimsen, Stavanger, Norway

[73] Assignee: Kverneland Klepp AS, Norway

[21] Appl. No.: 595,933

[22] Filed: Feb. 6, 1996

Related U.S. Application Data

[63] Continuation of Ser. No. 284,408, filed as PCT/GB93/00492 Mar. 9, 1993 published as WO93/17541 Sep. 16, 1993.

[30] Foreign Application Priority Data

Mar. 10, 1992 [SE] Sweden .................................. 9200744
May 8, 1992 [GB] United Kingdom .................... 9209929

[51] Int. Cl.⁶ .................................................. A01B 17/00
[52] U.S. Cl. ............................................ 172/219; 172/162
[58] Field of Search .............................. 111/52, 136, 140, 111/152, 186, 527; 172/162, 212, 219, 225, 271, 311, 427, 459, 772

[56] References Cited

U.S. PATENT DOCUMENTS

| | | | |
|---|---|---|---|
| 3,183,981 | 5/1965 | Schlabs | 172/162 |
| 3,232,354 | 2/1966 | Schlabs | 172/162 |
| 3,372,657 | 3/1968 | Hansen | 111/927 X |
| 3,476,191 | 11/1969 | Schlabs | 172/162 |
| 3,523,584 | 8/1970 | Godbersen | |
| 4,230,054 | 10/1980 | Hatcher | 172/271 X |
| 4,691,785 | 9/1987 | Post | 172/225 X |
| 5,381,866 | 1/1995 | Mong | 172/225 X |

FOREIGN PATENT DOCUMENTS

| | | |
|---|---|---|
| 0181039 | 5/1986 | European Pat. Off. . |
| 0274299 | 7/1988 | European Pat. Off. . |
| 0450436 | 10/1991 | European Pat. Off. . |
| 0457636A1 | 11/1991 | European Pat. Off. . |
| 266722A1 | 12/1989 | German Dem. Rep. . |
| 1122310 | 1/1962 | Germany . |
| 3534129 | 4/1986 | Germany . |
| 8403768 | 7/1986 | Netherlands . |

*Primary Examiner*—Terry Lee Melius
*Assistant Examiner*—Robert Pezzuto
*Attorney, Agent, or Firm*—Merchant, Gould Smith, Edell Welter and Schmidt

[57] ABSTRACT

A combination of a semi-mounted reversible plough (10) and a seed preparation device (11) are towed behind a tractor in order to carry out a ploughing action and a seed preparation action during a single pass over the ground. The plough has a short leading towing beam (12) provided with a forward hitch (13) for coupling the plough to the rear of the tractor; a long towing beam (15) coupled with beam (12); a carrying beam (20) coupled with long towing beam (15); a cylinder operated crank mechanism (17, 18) operable to rotate towing beam (15) and carrying beam (20) as a unit about the longitudinal axis (19) of beam (15) in order to reverse the position of the plough bodies; a coupling beam (24) mounted at its forward end via a mounting beam (43) on the carrying frame (20) and towing beam (15) and projecting laterally therefrom; a swivel connector (25) at the trailing end of coupling beam (24) which is attached to the leading end of a draw bar (41) of the device (11); and a cylinder operated parallelogram linkage (24, 29). Preferably, a seed unit (34), is coupled with the seed preparation device, so that ploughing, soil preparation and seeding can take place during a single passage across a field, and the entire combination can automatically adjust itself during reversal of the plough bodies and turning of the combination in the headland.

14 Claims, 3 Drawing Sheets

5,590,722

COMBINATION OF A REVERSIBLE PLOUGH AND SEED PREPARATION DEVICE

This is a File Wrapper Continuation Application of application Ser. No. 08/284,408, filed as PCT/GB93/00492 Mar. 9, 1993 published as WO93/17541 Sep. 16, 1993.

BACKGROUND OF THE INVENTION

This invention relates to a combination of a reversible plough and a seed preparation device, such combination being intended to be drawn behind a tractor or other propelling vehicle and to carry out in a single pass a ploughing and seed preparation action to make the soil ready for subsequent seed drilling.

A combination of a plough and a seed preparation device, such as a packer, is known, and the combination has the advantage of enabling the ground (which usually will comprise untilled ground such as straw stubble) to be both ploughed and then prepared ready for seeding in a single operation. This reduces the labor, time, and cost of preparing the ground and also total tractor time, as compared with previous practice of first ploughing the ground and then following with preparation of the ploughed surface in a separate and subsequent operation.

However, many existing combinations are relatively simple and merely comprise a temporary hitching together with a seed preparation device, such as a packer, to the rear of a trailed plough, so that the packer follows the plough rather in the manner in which a trailer follows a tractor. This means that the hitching together is a simple type of pivot hitch, which has to be uncoupled at the end of each series of ploughed furrows before the tractor and plough turn in the headland, the plough bodies are reversed, and then the packer is re-coupled to the rear of the plough frame for a return pass along the field.

In this simple and relatively unsophisticated existing design, the packer usually has two separate hitching points, one of which is coupled to the rear of the plough frame for travel in one direction, and the other is coupled to the rear of the plough frame for travel in the return direction. The packer, therefore, has to have one of its two hitches uncoupled just short of the headland each time. And the packer then remains parked in this position, while the tractor and plough turn round and the plough bodies are reversed, before the hitching point at the rear of the plough frame can be brought into register with the other of the hitches on the packer. This is an inconvenient and a time consuming task, which has to be carried out each time the combination reaches each headland. It would be a clear technical advantage if a design of combination could be developed which enables the two trailed components (plough and seed preparation device) to remain coupled together during movement of the combination over the headland.

With a view to avoid the necessity to uncouple the seed preparation device each time, there have been proposed tractor/implement combinations in which the plough is coupled directly behind a tractor in a usual way. But the seed preparation device, e.g. a power harrow, is front mounted on the tractor and comprises two separate implements, one extending perpendicularly to one side of the tractor and the other to the other side. During ploughing in one direction, only one of these implements operates to prepare soil ploughed during a previous passage in a reverse direction. And then after turning round in the headland and reversing the plough bodies, the other of the implements is operated to prepare the soil which has just been ploughed.

This tractor/implement combination is a very unwieldy combination with high inertia which is not easy to handle and maneuver, bearing in mind that the two implements extending laterally of the tractor increase the overall width of the tractor/plough/implement combination to about three times the normal width of the tractor/plough combination.

SUMMARY OF THE INVENTION

The invention, in one aspect, has therefore been developed primarily with a view to providing an improved means of coupling a trailed seed preparation device, such as a packer or power harrow, to the frame of a reversible plough in such a way that the seed preparation device can be readily adjusted (without need to uncouple the device) to a position suitable to operate with the plough in either of its two modes of operation.

According to a first aspect of the invention, there is provided a combination of a semi-mounted reversible plough and a seed preparation device, which combination is intended to be drawn behind a propelling vehicle in order to carry out a ploughing action on the ground and a seed preparation action during a single pass over the ground, in which:

the plough comprises a towing frame having a forward hitch for coupling the plough to the rear of the propelling vehicle, a carrying beam coupled with the towing frame and having pairs of reversible plough bodies mounted at spaced apart positions along the length of the carrying beam, and means for coupling the carrying beam to the towing frame for adjustment between a first working position in which one of the plough bodies of each pair is in a ploughing position and a second working position in which the other plough body of each pair is in a ploughing position;

the seed preparation device being coupled with the plough so that the device can be towed behind the plough in order to carry out a seed preparation action on the ploughed ground when the plough bodies are in the first or the second working position; and wherein the seed preparation device is coupled with the carrying beam of the plough via a coupling beam having a swivel connecting to the device which allows relative lateral displacement between the plough and the device and also allows movement of the carrying beam between the first and second working positions, so that the device can be adjusted to follow the plough in either working position.

The invention, therefore, provides a novel combination of reversible plough and trailed seed preparation device, which can operate such that each time the combination reaches the end of one pass across a field and is about to move over the headland in preparation for a reverse pass over the field, the trailed seed preparation device can be adjusted to take up a new position behind the plough bodies after the latter have been reversed from one working position to the other, with all of these adjustments taking place while the combination is being moved and without need to uncouple the device from the plough.

In a preferred embodiment, the seed preparation device comprises a packer.

Further, to provide additional reduction in labor and vehicle usage, it is preferred to couple a seed unit with the packer, and to provide drive to operate the seed unit from the forward movement of the packer, so that the ploughing, soil preparation, and seeding can take place in a single-pass operation.

The coupling beam is coupled at its rearward end with the device via said swivel connection, and preferably is pivotally connected to the carrying beam at a position intermediate the foremost and rearmost pair of plough bodies.

The towing frame preferably comprises a relatively short leading beam which is provided with said forward hitch at its forward end, and a longer towing beam on which said carrying beam is mounted. The longer beam is coupled with the shorter leading beam in such a way that the entire (longer) towing beam and the carrying beam coupled therewith can be pivoted generally about the longitudinal axis of the towing beam in order to reverse the position of the plough bodies.

By providing a relatively short leading beam, it makes the entire combination much more maneuverable than existing designs of reversible semi-mounted ploughs, characterized in that the towing vehicle (usually a tractor) can move through a relatively tight turning circle when moving over the headland, and without the rear wheels coming into contact with any parts of the plough.

In a preferred arrangement, the tractor can swing through an angle of up to 90° relative to the leading beam. This makes the turning movement over the headland easier to take place, which is of particular advantage when towing a lengthy combination of implements, e.g. a semi-mounted reversible plough, packer, and seed unit.

However, this design feature in the plough will be advantageous in a semi-mounted reversible plough per se, i.e. without necessarily having a seed preparation device coupled therewith. This is, therefore, a second aspect of the present invention as defined below.

Accordingly, in a second aspect of the invention, there is provided a semi-mounted reversible plough which comprises:

a leading beam having a forward hitch for coupling the plough to the rear of a propelling vehicle;

a longer towing beam coupled with the leading beam and forming a rearward prolongation thereof;

a carrying beam coupled with the towing beam and having pairs of reversible plough bodies mounted at spaced apart positions along the length of the carrying beam, and means for coupling the carrying beam to the towing beam for adjustment between a first working position in which one of the plough bodies of each pair is in a ploughing position and a second working position in which the other plough body of each pair is in a ploughing position;

wherein the towing beam and the carrying beam are rotatable a unit about the longitudinal axis of the towing beam in order to adjust the plough bodies between the first and second working positions.

In a particularly preferred embodiment of combination according to the first aspect of the invention, the seed preparation device is a packer having a forward set of crumbler or packer wheels for breaking down soil turned over by the plough bodies, and a rearward set of support wheels of a large surface area to support the packer (and preferably also the trailing end of the plough via the coupling beam). By reason of the large surface area of the support wheels, a low pressure contact with the ground is achieved which supports the packer and further assists the breaking down of the soil into a form suitable for drilling seed.

When, as is preferred, the sole or main vertical support for the trailing end of the plough is provided by the packer, it results in load transfer to the packer from the plough with consequent increased effectiveness in the soil crumbling action of the packer wheels. This means that a relatively lightweight packer can be used, thereby making the packer more readily pulled and maneuvered. Alternatively, a packer of standard weight will be even more effective via the load transfer from the plough.

The packer is preferably provided with a set of transport wheels which are lifted out of contact with the ground during ploughing, but which can be lowered for transport purposes.

In addition, the ground wheels of the packer can be lowered shortly after lifting of the forward end of the plough via the usual lifting hitch on the tractor when the leading plough body reaches the end of a furrow adjacent to the headland. This enables the following plough bodies to continue ploughing through the ground at generally the same depth until they reach the headland. Despite the lowering of the transport wheels, the packer wheels remain in contact with the soil when, as is preferred, spring loading is provided to act downwardly on the packer wheels and urge them into contact with the ground.

Preferably, the initiation of relative lateral displacement of the packer is achieved by providing a cylinder operated parallelogram-type linkage as part of the coupling beam (with the beam forming one of the four sides of the linkage) and which is operated in order to pivot the coupling beam relative to a forward pivot mounting of the coupling beam, so that continued forward movement of the plough and packer will result in relative lateral displacement of the packer.

This will usually take place while the plough and packer are being pulled and turned around over the headland. Once the packer has reached the limit of its lateral displacement, the carrying beam can then be rotated about the axis of the towing beam to the reversed plough position, characterized in that the axis of rotation will pass substantially through the swivel connection, which rotates with the towing beam until the plough bodies take up the new position.

The seed drill may be of generally known design, with hopper seed storage and rotary feed roller to discharge the seeds, but drive to the feed roller will be provided via a chain or other transmission from a wheel axle of the packer.

A soil loosener, preferably downwardly spring loaded, and also upwardly and downwardly adjustable, is provided to loosen the soil after sowing of the seed.

In that the carrying beam is rotatable about the longitudinal axis of the towing beam, as it is adjusted between the first and second working positions, in either of which it is located generally on the same level as the towing beam, it should be appreciated that the carrying beam will move through an overhead position in which it is located over and above the towing beam. This overhead position conveniently comprises a suitable transport position for the plough. Thus, the plough bodies will be located above the towing beam, and in view of the arrangement of each pair of plough bodies on the carrying beam, they will project equally to either side of the longitudinal axis of the carrying beam (and of the towing beam located below it), so as to occupy minimum overall width of the plough.

The coupling beam and the swivel connection can readily permit this movement of the carrying beam. In this transport position, the transport wheels of the packer can be lowered, and the entire assembly of plough, packer, and seed unit then extend substantially in line, and can readily be transported through field entrances and along the public highway, without presenting any serious obstacle to traffic.

BRIEF DESCRIPTION OF THE DRAWINGS

One embodiment of the first and second aspects of the invention will now be described in detail, by way of example only, with reference to the accompanying drawings, in which.

DETAILED DESCRIPTION OF THE PREFERRED EMBODIMENT

Figure 1:
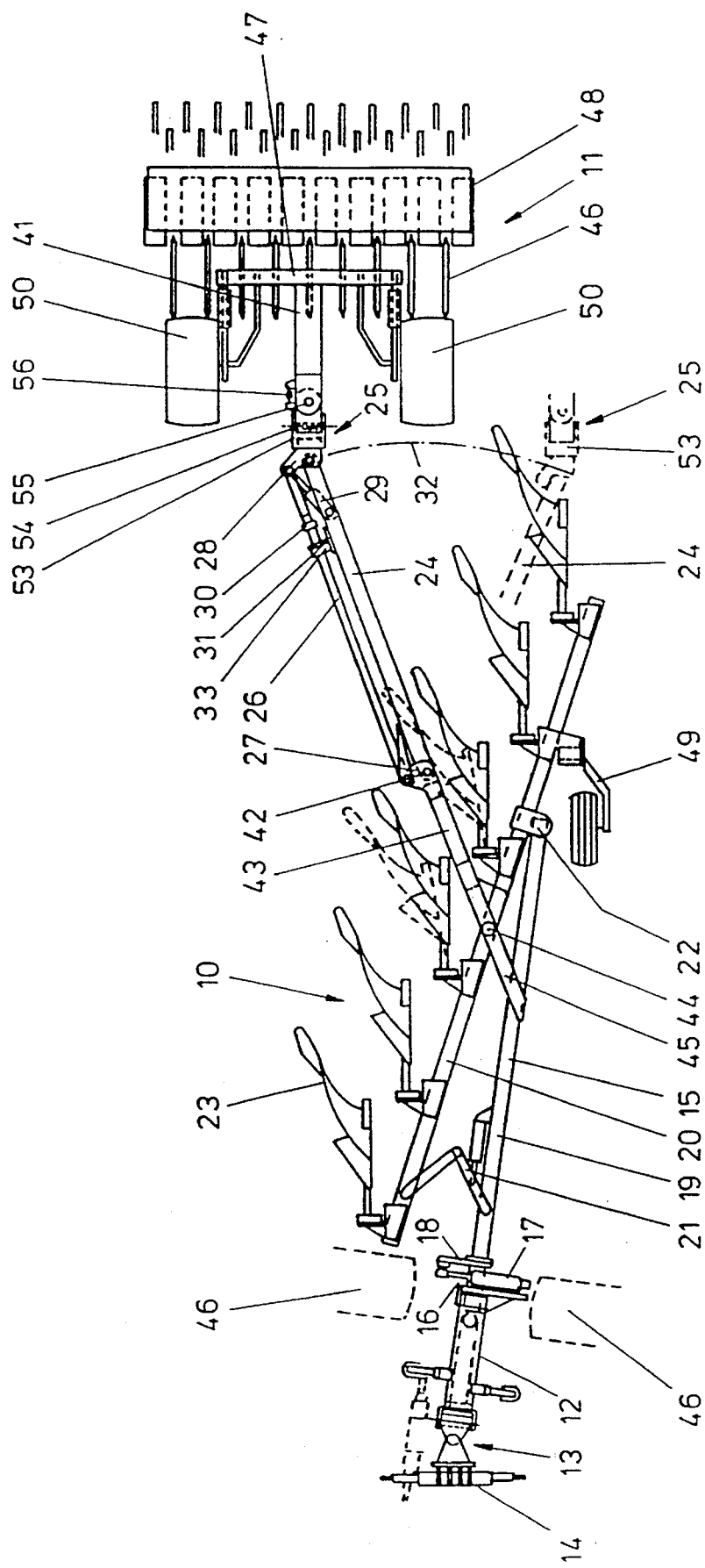
FIG. 1 is a plan view of a trailed combination of a reversible semi-mounted plough and seed preparation device.

Referring now to the drawings, there is shown a combination of a reversible semi-mounted plough 10 and a seed preparation device 11 in the form of a so-called packer. This combination is intended to be drawn behind a propelling vehicle, usually an agricultural tractor, in order to carry out a ploughing action on the ground and a seed preparation action during a single pass over the ground.

The plough comprises a towing frame having a short leading beam 12 provided with a towing hitch 13 at its forward end for coupling the plough to the rear hitch 14 of a tractor or other propelling vehicle. The towing frame also includes a longer towing beam 15 which is coupled with the trailing end 16 of leading beam 12 so as to be capable of rotating under the action of a cylinder 17 and crank 18 about its longitudinal axis 19 in order to adjust the reversible plough between its two working positions.

A carrying beam 20 is coupled with towing beam 15 via a cylinder operated toggle linkage 21 at its forward end which can vary the angle between beam 15 and beam 20 at its rear end 22. Carrying beam 20 is provided with a set of plough bodies 23 arranged in pairs along its length, with the plough bodies of each pair being arranged one above the other. The entire carrying beam 20 and plough bodies 23 can be bodily adjusted about the axis 19 of towing beam 15 under the action of crank 18 in order to adjust the plough between its two working positions, in one of which one of the plough bodies of each pair is in the working position, and in the other working position the other plough body of each pair is brought to a ploughing position.

The packer 11 is coupled with the plough frame so that it can be towed behind the plough in order to carry out a seed preparation action on the ploughed ground when the plough bodies 23 are in the first or the second position.

The coupling between plough 10 and packer 11 comprises a coupling beam 24 having a swivel connector 25 at its rearward end connecting to the packer 11, and which allows relative lateral displacement to take place between plough 10 and a packer 11, and also allows movement of the carrying beam 20 between its two working positions, so that the packer 11 can be adjusted to follow the plough bodies 23 in either working position.

FIG. 1 shows in full line illustration the normal seed preparation position of the packer 11. There is shown in dashed outline the relative laterally displaced position taken up by the beam 24 and swivel connector 25. This relative lateral displacement will be initiated when the combination reaches a headland, and to this end the coupling beam 24 is incorporated in a parallelogram-type linkage comprising rod 26 and crank arms 27 and 28 and operation of a cylinder 29 acting on crank arm 28 initiates linear displacement of rod 26 until stop nut 30 engages abutment 31. During this adjustment of the linkage, the combination will continue to be towed forwardly over the headland. Therefore, the packer 11 carries out relative lateral displacement along the arc of travel 32 in order to take up the position of beam 24 and swivel 25 shown in dashed outline. This can occur while the tractor is turning itself, and also turning the combination. Once the packer 11 has reached the laterally displaced position, the carrying beam 20 can then be rotated about the axis 19 of towing beam 15 to reverse the plough bodies. This rotation of the carrying beam 20 and also of towing beam 15 is readily permitted, relative to packer 11, by virtue of the swivel connector 25. Then, prior to a return pass along the field, cylinder 29 is operated to restore rod 26 to the position shown in full lines, where a stop nut 33 engages abutment 31, and the combination is then ready to carry out a return pass.

There is, therefore, provided a novel combination of reversible plough, preferably of the semi-mounted type, and a trailed seed preparation device, and which can operate such that each time the combination reaches the end of one pass across a field and is about to move over the headland in preparation for a reverse pass over the field. The trailed seed preparation device can be adjusted to take up a new position behind the plough bodies after the latter have been reversed from one working position to the other, with all of these adjustments taking place while the combination is being moved, and without need to uncouple the packer 11 from the plough 10.

Further, to provide additional reduction in labor and vehicle usage, a seed drill unit 34 is coupled with the packer 11, and drive to operate the seed unit 34 is derived by a chain or other transmission coupled with one of the wheel axles of the packer. This enables ploughing of untilled ground, soil preparation, and seeding to take place in a single pass operation.

The seed unit 34 comprises a hopper 35 for seed, such as grain, and which will have a rotary feed roller (not shown) to distribute the seeds. A soil loosener 36 is mounted on the frame of the assembly of packer 11 and seed unit 34 to loosen the soil and thereby cover the seeds. A trailing soil pressing device 37 completes the seeding operation. The soil loosener 36 is spring loaded in a downward direction by spring 38 whose tension can be adjusted by control handle 39. The depth of soil loosener 36 can be adjusted by adjusting handle 40.

Returning now to the description of the means by which the packer 11 (and seed unit 34) are coupled with the frame of the plough 10, the rear end of coupling beam 24 is coupled with the forward end of a draw bar 41 of the packer 11 via the swivel connector 25, whereas the forward end of coupling beam 24 is mounted on a pivot 42 provided at the trailing end of a mounting beam 43 which is pivotally mounted on carrying beam 20 via a pivot 44. Pivots 42 and 44 extend substantially vertical when the plough is adjusted to either of its two working positions, as can be seen in FIG. 1. But upon rotation of carrying beam 20 about the axis 19 of towing beam 15, pivots 42 and 44 will move through a horizontal orientation, as shown for the transport position in FIG. 3, before being inverted on reaching the new working position.

The mounting beam 43 has a forwardly projecting forked end 45, between the limbs of which the towing beam 15 is located. The mounting beam 43 and coupling beam 24 are normally maintained as a rigid substantially co-linear assembly, maintained at a fixed angle relative to carrying beam 20 as shown in FIG. 1. But when cylinder 29 is operated to adjust the parallelogram linkage, coupling beam 24 can undergo relative lateral displacement about pivot 42 as described above, and shown in FIG. 1.

By virtue of the relatively short length of leading beam 12 provided with the forward hitch 13 and the arrangement whereby the carrying frame 20 and the towing beam 15 can rotate jointly about the axis 19 of beam 15 in order to adjust the plough between its two working positions, this makes the entire combination much more maneuverable than existing designs of reversible semi-mounted ploughs, characterized in that the tractor can move through a relatively tight turning circle when moving over the headland and indeed can swing through an angle of up to 90° relative to leading beam 12, without being obstructed by any parts of the plough, and as can be seen by the dashed outline of the rear wheels 46 of the tractor shown in FIG. 1. This feature is particularly advantageous in the arrangement shown in the drawings, comprising a combination of semi-mounted reversible plough, packer, and seed unit coupled together. But this feature will also be advantageous for provision in a semi-mounted reversible plough per se, whether or not it has any other implements trailed behind it.

Returning now to the packer 11, more detailed description of its component parts will now be made. The packer 11 is a preferred embodiment of seed preparation device for use in combination with a semi-mounted reversible plough. But it should be understood that the invention is not restricted to use of a packer, and other types of seed preparation device may be used, such as a rotary harrow.

Packer 11 has a forward set of crumbler or packer wheels 46 mounted on axle 47, and these can be of standard design. Behind the wheels 46 is a rearward set of support wheels 48 which have much larger surface areas, as can be seen in FIG. 1, and therefore can make low pressure contact with the ground in order to support the packer 11, and also to assist the breaking down of the soil after treatment by the wheels 46. The combined action of wheels 46 and 48, acting on ground ploughed by the plough bodies 23, enables soil to be prepared suitable for seed drilling to take place. All of this occurring during a single pass over a field, which can be previously untilled ground, e.g. straw stubble.

The forward end of the plough 10 is supported via hitch 13. But at least part of the load of the plough is transmitted to and borne by the packer 11 via the beams 43 and 24. A ground support wheel 49 may be provided at the rearward end of carrying frame 20, as shown in FIGS. 1–3, to provide at least some vertical support for the semi-mounted plough.

By reason of the load transfer to the packer 11, this results in increased effectiveness of the soil crumbling action of the packer wheels 46. Therefore, a relatively lightweight design of packer can be used, thereby making the packer more readily pulled and maneuvered. Alternatively, a packer of standard weight can be made even more effective via this load transfer.

Figure 2:
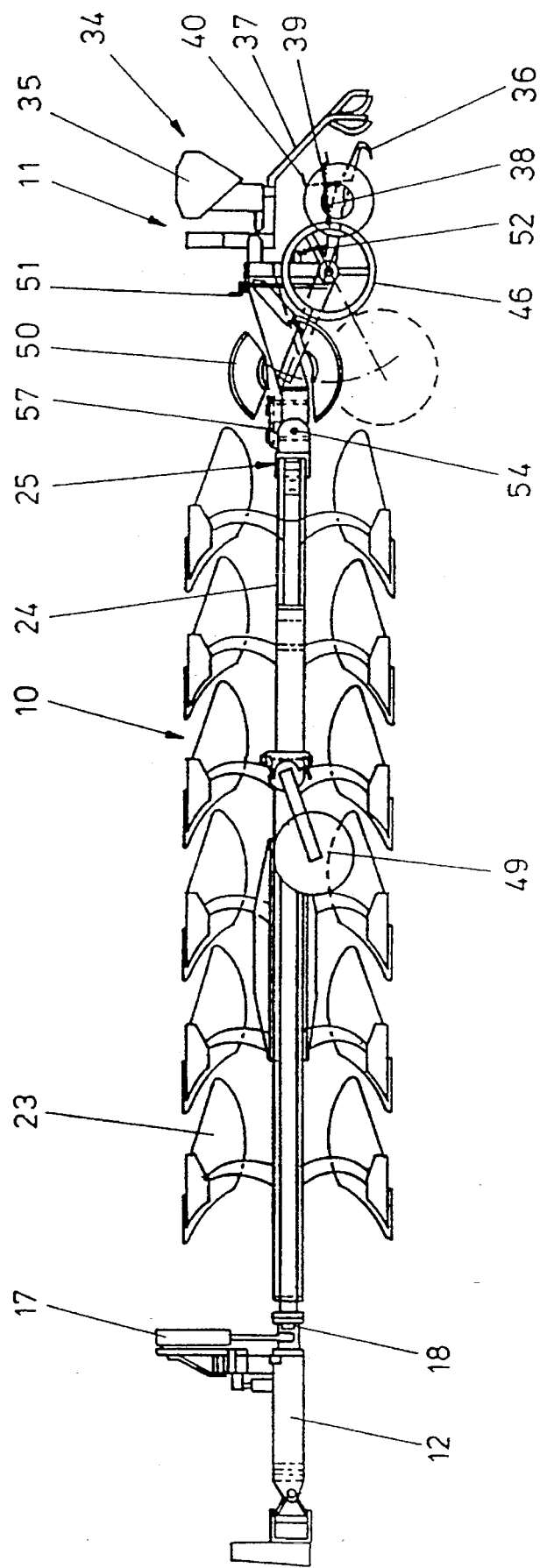
FIG. 2 is a side view of the combination shown in FIG. 1, with the plough bodies shown in one working position.
Figure 3:
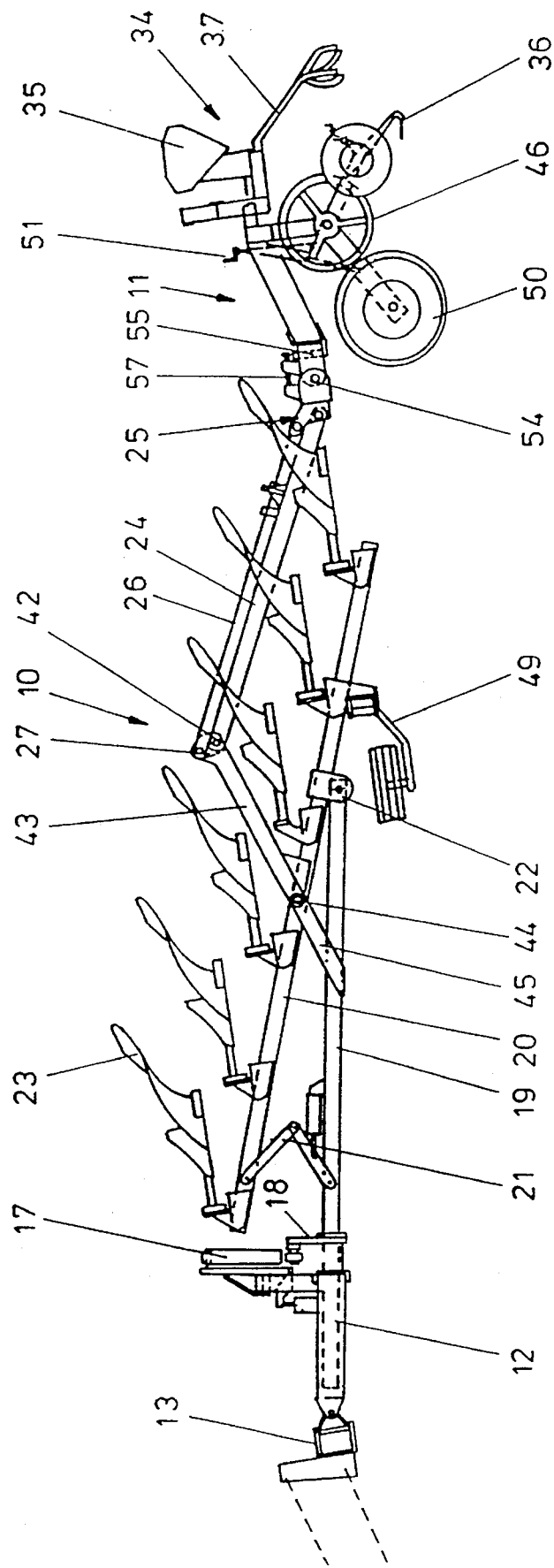
FIG. 3 is a side view, similar to FIG. 2, but showing both the plough and the seed preparation device adjusted to a suitable transport position.

The packer 11 is provided with a set of transport wheels 50 which are lifted out of contact with the ground during ploughing, but which can be lowered for transport purposes, as shown in FIG. 3, and also can be lowered into contact with the ground during the final stage of ploughing as the combination approaches the headland, as shown in dashed outline FIG. 2.

As the tractor approaches the headland, the lifting hitch at the rear of the tractor will be activated in order to raise the leading plough body out of contact with the ground, and at the same time, or shortly afterwards, wheels 50 of the packer 11 are lowered into contact with the ground. Successive plough bodies then are able to complete their ploughing action and then lift out from contact with the ground as they approach and then move over the headland.

The depth of the packer wheels 46 can be adjusted by an adjustment handle 51. But in addition, spring loading 52 can urge the packer wheels 46 downwardly to remain in working engagement with the ploughed surface as the combination moves towards the headland.

FIG. 1 is a plan view showing the plough bodies 23 in one working position, with the packer 11 and seed unit 34 coupled behind the plough as a trailed combination. But upon operation of the cylinder 17 and crank 18, the entire assembly of towing beam 19, carrying beam 20, and plough bodies 23 can pivot through approximately 180° about the axis 19 of beam 15, and then bring the previously uppermost plough body 23 of each pair to the lowermost working position. The previously lower ground engaging plough body is then in the upper inoperative position. This adjustment of the plough can take place during forward and turning movement of the tractor and combination, after the relative lateral displacement of the packer 11 and seed unit 34 has been completed, as shown by dashed outline and described above with reference to FIG. 1. The swivel connector 25 permits rotation of coupling beam 24 and crank arm 28 of the parallelogram linkage about a generally horizontal and forwardly extending axis 53 as shown in FIG. 1.

However, if it is required to move the plough to a transport position, the rotation of carrying frame 20 from either working position will be through an angle of about 90° only to take up the position shown in FIG. 3 in which carrying beam 20 extends over and substantially vertically above the towing beam 15. In this position, the plough bodies 23 of each pair form a V shaped profile, as viewed along the axis of the combination, whereby they present minimum width to the plough for transport purposes. FIG. 3 also shows the positions taken by beams 24 and 43 and also by the packer 11 in the transport position. It will be noted that plough wheel 49 is out of contact with the ground, and transport wheels 50 of the packer 11 provide support for the rear end of the combination.

As shown in FIG. 1, fine adjustment of the angular setting of draw bar 41 about a vertical pivot 55 can be obtained by adjustment of threaded adjuster 56, whereas fine adjustment of the attitude adopted by draw bar 41 about longitudinal pivot 54 is obtained by adjustment of threaded adjuster 57.

I claim:

1. A combination of a semi-mounted reversible plough and a seed preparation device, said combination being drawn behind a propelling vehicle to carry out a ploughing action on ground and a seed preparation action during a single pass over the ground, wherein:

the plough comprises:

a towing frame having a forward hitch for coupling the plough to a rear of the propelling vehicle;

a carrying beam coupled with the towing frame and having pairs of reversible plough bodies mounted at spaced apart positions along a length of the carrying beam; and means for coupling the carrying beam to the towing frame for adjustment between a first working position in which one of the plough bodies of each pair is in a ploughing position and a second working position in which the other plough body of each pair is in a ploughing position;

the seed preparation device is coupled with the plough so that the seed preparation device is towed behind the plough in order to carry out the seed preparation action on a ploughed ground when the plough bodies are in the first or the second working position; and wherein the seed preparation device is coupled with the carrying beam of the plough via a coupling beam having a swivel connecting with said device which allows relative lateral displacement between the plough and the device, and also allows movement of the carrying beam between the first and second working positions so that the device can be adjusted to follow the plough bodies in either working position.

2. A combination according to claim 1, wherein the seed preparation device comprises a packer.

3. A combination according to claim 1, wherein a seed unit is coupled with the device.

4. A combination according to claim 1, wherein the coupling beam is coupled at its rearward end with said seed preparation device via the swivel connection, and is pivotally connected to the carrying beam on a pivot located at a position between foremost and rearmost pairs of the plough bodies.

5. A combination according to claim 1, wherein the towing frame comprises a relatively short leading beam which is provided with said forward hitch, and a relatively longer towing beam on which said carrying beam is mounted, said relatively longer towing beam being coupled with the leading beam in such a way that the towing beam and the carrying beam coupled therewith are pivotable as a unit about a longitudinal axis of the towing beam in order to reverse a position of the plough bodies.

6. A combination according to claim 2, wherein the packer has a forward set of packer wheels and a rearward set of support wheels of large surface area to bear a load of the packer and also to apply further soil preparation action.

7. A combination according to claim 6, wherein at least part of a weight of the plough is transferred to the packer via the coupling beam in order to apply a downward action on the packer wheels.

8. A combination according to claim 7, wherein a set of transport wheels are provided on the packer and which are lifted out of contact with the ground during ploughing, but can be lowered for transport purposes.

9. A combination according to claim 8, further including a seed unit coupled with the seed preparation device.

10. A combination according to claim 9, wherein the seed unit is driven from the seed preparation device.

11. A combination according to claim 10, wherein the coupling beam comprises part of a parallelogram linkage which is adjustable in order to initiate relative lateral displacement to take place between the plough and the seed preparation device by allowing coupling beam to pivot about a pivot at its forward end.

12. A combination according to claim 11, wherein said pivot at the forward end of coupling beam is provided on a trailing end of a support beam mounted on the carrying beam.

13. A semi-mounted reversible plough which is drawn behind a propelling vehicle to carry out a ploughing action on ground, the plough comprising:

a leading beam having a forward hitch for coupling the plough to a rear of the propelling vehicle, and a relatively longer towing beam in comparison with the leading beam, coupled with the leading beam and forming a rearward prolongation thereof;

a carrying beam coupled with the towing beam and having pairs of reversible plough bodies mounted at spaced apart positions along a length of the carrying beam; and means for coupling the towing beam to the leading beam in such a way that the towing beam and the carrying beam coupled therewith via couplings are pivotable as a combined unit about a longitudinal axis of the towing beam in order to adjust the plough between a first working position in which one of the plough bodies of each pair is in a ploughing position, and a second working position in which the other plough body of each pair is brought into the ploughing position.

14. A plough according to claim 13, wherein a coupling beam is mounted on the carrying beam and the towing beam, and projects laterally therefrom, and a swivel connector is provided at a trailing end of the coupling beam and which can be coupled to a hitching point of an implement to be towed behind the plough, said swivel connector allowing relative rotation to take place between the coupling beam and the implement about a generally horizontal axis extending generally parallel to a longitudinal axis of the combination during reversal of position of the plough bodies.

* * * * *